United States Patent
Wang

(10) Patent No.: US 7,110,055 B2
(45) Date of Patent: Sep. 19, 2006

(54) REFLECTIVE TYPE FERROELECTRIC LIQUID CRYSTAL DISPLAY AND DRIVING METHOD THEREOF

(75) Inventor: Jong-Min Wang, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/682,423

(22) Filed: Oct. 10, 2003

(65) Prior Publication Data

US 2004/0114091 A1     Jun. 17, 2004

Related U.S. Application Data

(62) Division of application No. 10/195,738, filed on Jul. 16, 2002, now abandoned.

(30) Foreign Application Priority Data

Oct. 10, 2001     (KR)     ............... 2001-62461

(51) Int. Cl.
*G02F 1/133*     (2006.01)
(52) U.S. Cl. .................. 349/33; 349/74; 349/172
(58) Field of Classification Search ........... 349/74, 349/75, 77, 33; 345/87, 89, 95
See application file for complete search history.

(56) References Cited

U.S. PATENT DOCUMENTS

| | | | | |
|---|---|---|---|---|
| 5,073,010 A | * | 12/1991 | Johnson et al. ............... 349/28 |
| 5,245,451 A | * | 9/1993 | Wu et al. ..................... 349/75 |
| 6,130,731 A | * | 10/2000 | Andersson et al. ........... 349/77 |
| 6,380,997 B1 | * | 4/2002 | Sharp et al. ................ 349/119 |
| 6,545,738 B1 | * | 4/2003 | Son et al. ................... 349/172 |
| 6,671,015 B1 | * | 12/2003 | Tanada et al. .............. 349/113 |

* cited by examiner

*Primary Examiner*—Toan Ton
*Assistant Examiner*—Richard H. Kim
(74) *Attorney, Agent, or Firm*—Sughrue Mion, PLLC

(57) ABSTRACT

The present invention discloses a reflective type ferroelectric liquid crystal display and a driving method thereof. The reflective type ferroelectric liquid crystal display comprises a display panel which is disposed between a polarization beam splitter and a mirror to satisfy a quarter plate condition, and in which a liquid crystal layer formed between electrode layers is filled with half-V type ferroelectric liquid crystal having a bookshelf structure, the electrode layers being disposed between substrates to be orthogonal and opposite to each other; and a compensation panel which is disposed between the display panel and the polarization beam splitter to satisfy a half plate condition, and in which a liquid crystal layer formed between electrode layers is filled with half-V type ferroelectric liquid crystal having a bookshelf structure, the electrode layers being disposed between substrates to be opposite to each other. Therefore, the light loss can be reduced, and thus the gray scale display can be improved.

2 Claims, 7 Drawing Sheets

REFLECTIVE TYPE FERROELECTRIC LIQUID CRYSTAL DISPLAY AND DRIVING METHOD THEREOF

This is a divisional of application Ser. No. 10/195,738 filed Jul. 16, 2002 now abandoned; the disclosure of which is incorporated herein by reference.

BACKGROUND OF THE INVENTION

1. Field of the Invention

The present invention relates to a reflective type ferroelectric liquid crystal display and a driving method thereof, more particularly, to a reflective type ferroelectric liquid crystal display in which a transmittance is increased and thus a luminance is increased, and a driving method thereof. The present application is based on Korean Patent Application 2001-62461, filed Oct. 10, 2001, which is incorporated herein by reference.

2. Description of the Related Art

A liquid crystal display is a flat type display, which is widely used for a portable device. Due to the fast development in the scale-up technology, the liquid crystal display is rapidly replacing a conventional CRT (cathode ray tube) display.

There are various kinds of liquid crystal materials applied to the liquid crystal display.

A TN (twisted nematic) liquid crystal, which is generally used as the liquid crystal material, utilizes the interaction between dielectric anisotropy of liquid crystal molecules and electric field, causing several drawbacks like an inefficient display of moving pictures due to a slow reaction time of a few tens of milliseconds (ms), and a narrow visual angle. Also, since cross-talk occurs between the pixels within a certain distance, it is difficult to reduce the pixel size.

Meanwhile, an FLCD (ferroelectric liquid crystal display) utilizes the interaction between spontaneous polarization of ferroelectric liquid crystal and electric field, and provides a rapid response property of 1 ms or lower to display moving pictures without any difficulty. It also provides a wide visual angle. The pixel size, in which cross-talk between pixels does not occur, can be reduced due to the strong interaction between molecules in an FLCD, so that high resolution display is achieved. For the advantages as described above, the field of FLCD has been researched extensively as a next-generation display device.

As one of the ferroelectric liquid crystal materials, which is widely used, there is provided a liquid crystal material of a chiral smectic C-phase (SmC*) having a bistable property and a chevron structure.

In a fabricating process of the FLCD device using the liquid crystal material as described above, the liquid crystal material is injected into a cell between substrates, while being maintained at a desired temperature which is higher than a melting point thereof. Then, when the temperature is dropped, the liquid crystal material of chiral smectic C-phase (SmC*) is transformed to a chiral nematic phase (N*), and then to a smectic A-phase having a layer structure perpendicular to a rubbing direction, and then transformed back to the chiral smectic C-phase. In this process, a long-axis direction of a liquid crystal molecule in a liquid crystal layer is tilted to a desired angle relative to the rubbing direction, reducing the space between smectic layers. As a result, the smectic layer is bent in the liquid crystal layer in order to compensate for a change in volume. The bent layer structure is called the chevron structure, and domains are defined, each having a different long-axis direction according to the bending direction. On a boundary surface between the domains, there is formed a non-uniform orientation having a zigzag defect, a hair-pin defect and a mountain defect.

Due to the orientation property as described as above, a contrast ratio is remarkably lowered. If a DC (direct current) voltage is forcibly exerted in order to prevent the lowering of the contrast ratio, ions within the liquid crystal layer are accumulated on or adsorbed into a surface of an alignment film. Therefore, problems like afterimage effect occur, that is, the previous display pattern is dimly displayed on a current display pattern when a previous display state is changed into the current display state.

Further, a ferroelectric liquid crystal material for providing an AFLC (anti ferroelectric liquid crystal) mode, in which the threshold limit is reduced, is actively being researched. However, since it has a spontaneous polarization value of 100 $nC/cm^2$, the ions are moved due to a depolarization field, and thus the afterimage can be generated. In addition, in the case where an active matrix driving method is applied where the liquid crystal is independently driven in each pixel using a TFT (thin film transistor), the leakage current can be generated by the large spontaneous polarization value. In order to restrict the leakage current, a capacitance has to be increased. However, in this case, since an aperture ratio is reduced, it is difficult to use it as a display device.

To solve the disadvantage of the ferroelectric liquid crystal, the ferroelectric liquid crystal material having a bookshelf structure has been steadily studied where AC (alternating current) driving can be performed and the afterimage is controlled.

There has been provided a ferroelectric liquid crystal having the bookshelf structure, in which the phase transformation is performed without transformation into the smectic A-phase in a crystallization process. That is, when dropping the temperature from an isotropic state of which the temperature is higher than a melting point, the phase is transformed through the chiral nematic phase (N*) and the chiral smectic C-phase (SmC*) in a crystallization process. As one of the liquid crystals in which the phase is transformed from the chiral nematic phase into the chiral smectic C-phase, there is a half-V type liquid crystal having a mono stable property.

In the half-V type liquid crystal, as shown in FIG. 1, when the potential is not applied, an optical axis of the liquid crystal is parallel to the rubbing direction of an alignment film. When the positive potential is applied, the long axis of the liquid crystal is tilted up to a maximum angle of 45°. In FIG. 1, a reference symbol $V_{sat}$ designates a saturation voltage by which the liquid crystal is maximally tilted.

And when the negative potential is applied, the long axis of the liquid crystal is aligned in a direction which is the same as that of the long axis of the liquid crystal when the potential is not applied. The liquid crystal described above has a relationship between the applied potential and the transmittance, as shown in FIG. 2, i.e., the mono stable property.

Therefore, the liquid crystal has an advantage in that it is possible to perform the AC driving. It is called the half-V type liquid crystal in consideration of the applied potential versus transmittance property.

In the reflective type liquid crystal display in which the half-V type liquid crystal is applied, when the potential is not applied or the negative potential is applied, as shown in FIG. 3, S wave, which is incident to a polarization beam splitter (PBS) 1 and then reflected to a panel 2, maintains a polarized state even after being reflected by a mirror 3 and passing through the panel 2 again. Then, the S wave is reflected by the PBS 1 in the same direction as the light incident direction. In this case, since light is not transmitted in a display direction, perpendicular to the light incident direction, the display state becomes black. However, as shown in FIG. 4, if the positive potential, which is higher than the threshold voltage, is applied, the liquid crystal molecule is gradually tilted corresponding to the applied potential. The S wave, which is incident to the panel 2, is partially transformed into P wave while being reflected by the mirror 3 and passing through the panel 2. A part of the light passes through the PBS 1. The amount of light transmitted through the PBS 1 is increased according to an increase in the applied potential. As shown in FIG. 5, the light amount becomes maximum when the liquid crystal molecule is tilted at an angle of 45°. At this time, since the long axis of the liquid crystal is titled at the angle of 45° with respect to the rubbing direction, the S wave, which is incident through the PBS 1 to the panel 2, is transformed into the P wave while passing through the panel 2 from the mirror 3 in an opposite direction. Therefore, the entire light passes through the PBS 1 and the display state becomes white.

As described above, the half-V type liquid crystal has an advantage of the bookshelf structure. FIG. 6 shows a relationship with the transmittance when performing the AC driving in a cycle corresponding to a data displaying period. In the drawing, a solid line designates the applied voltage and a one-dotted line designates the transmittance.

As shown in FIG. 6, the light is blocked in a negative potential applied region during an AC driving period (T). Therefore, in case the saturation voltage for maximally tilting the liquid crystal is 3V, if a voltage, which is lower than the saturation voltage, is applied, as indicated in a region A during the AC driving period (T), a transmittance of 50% or below on the average is obtained. Further, if the saturation voltage (3V) is applied, as indicated in a region B, a transmittance of 50% on the average is obtained. The potential is not applied in a region C. In this case, the light is blocked. In the conventional half-V type liquid crystal display, as described above, in case the AC driving is performed to maintain stability of the liquid crystal, there is a disadvantage in that only a maximum average transmittance of 50% is obtained during the displaying period.

In order to restrict the light loss, if an asymmetric DC voltage is applied, ions in the liquid crystal accumulates on a surface, thereby generating the afterimage. Further, there is a problem that the liquid crystal is easily degenerated.

SUMMARY OF THE INVENTION

It is therefore an object of the invention to provide a reflect type ferroelectric liquid crystal display and a driving method thereof, in which the AC driving of a ferroelectric half-V type liquid crystal can be performed, light loss is restricted, and a gray scale can be precisely displayed.

In accordance with one aspect of the present invention, there is provided a reflective type ferroelectric liquid crystal display, comprising a display panel which is disposed between a polarization beam splitter and a mirror to satisfy a quarter plate condition, and in which a liquid crystal layer formed between electrode layers is filled with half-V type ferroelectric liquid crystal having a bookshelf structure, the electrode layers being disposed between substrates to be orthogonal and opposite to each other; and a compensation panel which is disposed between the display panel and the polarization beam splitter to satisfy a half plate condition, and in which a liquid crystal layer formed between electrode layers is filled with half-V type ferroelectric liquid crystal having a bookshelf structure, the electrode layers being disposed between substrates to be opposite to each other.

Preferably, a rubbing direction of an alignment film of the display panel is orthogonal to a rubbing direction of an alignment film of the compensation panel.

Further, the material of the half-V type ferroelectric liquid crystal has a property, by which the phase of the half-V type ferroelectric liquid crystal is transformed from a chiral nematic phase into a chiral smectic C-phase while dropping a temperature of the ferroelectric liquid crystal in the crystallization process.

In accordance with another aspect of the present invention, there is a method of driving a reflective type ferroelectric liquid crystal display having a polarization beam splitter, a compensation panel in which half-V type ferroelectric liquid crystal is filled between electrode layers disposed to be opposite to each other, a display panel in which half-V type ferroelectric liquid crystal is filled between electrode layers disposed to be orthogonal to each other and mirror in turn, comprising steps of applying an AC potential to the electrode layer of the compensation panel; and applying an AC potential corresponding to a gray scale of display data to the electrode layer of the display panel.

Preferably, an AC potential, by which an included angle between an axis of the liquid crystal of the compensation panel and an axis of the liquid crystal of the display panel wherein when a potential is not applied to the display panel, the included angle ($\theta c$) can be varied between 67.5° and 90°, said potential is applied to the electrode layer of the compensation panel.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

The preferred embodiment of the present invention will now be described with reference to the drawings.

Figure 1:
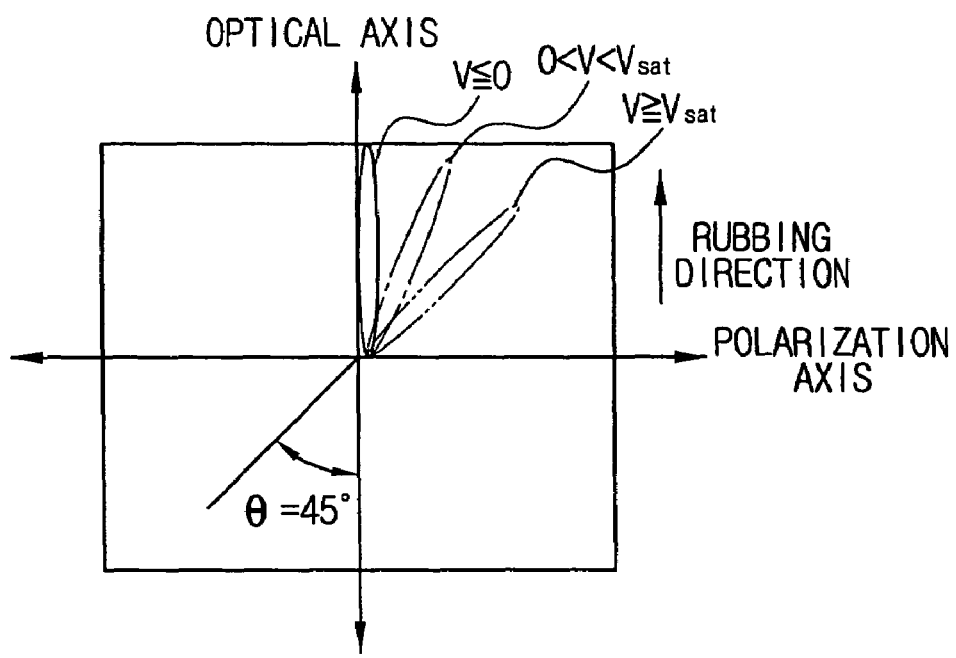
FIG. 1 is a schematic view showing a state that an axis of liquid crystal is tilted in a half-V type ferroelectric liquid crystal having a conventional bookshelf structure according to an intensity of applied voltage.
Figure 2:
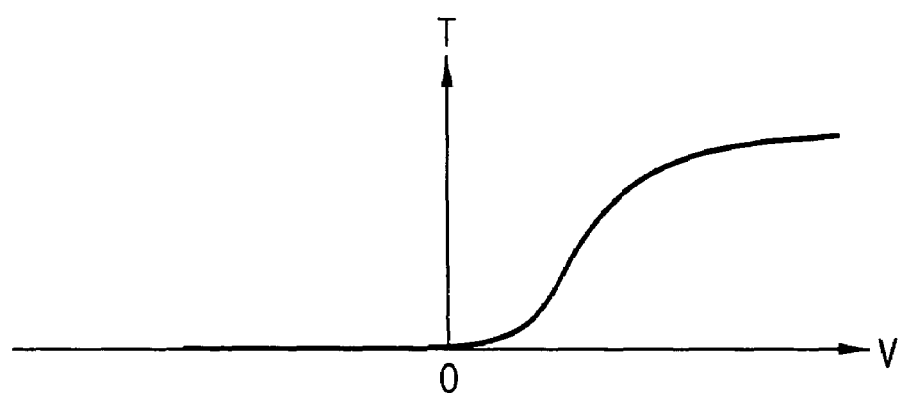
FIG. 2 is a graph showing a relationship between transmittance and the applied voltage of the half-V type ferroelectric liquid crystal of FIG. 1.
Figure 3:
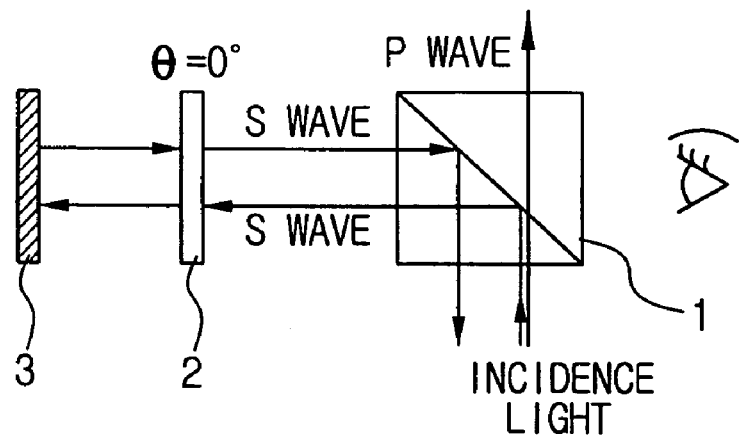
FIG. 3 is a schematic view showing a light path when a potential is not applied to a conventional reflective type display device in which the half-V type ferroelectric liquid crystal is applied.
Figure 4:
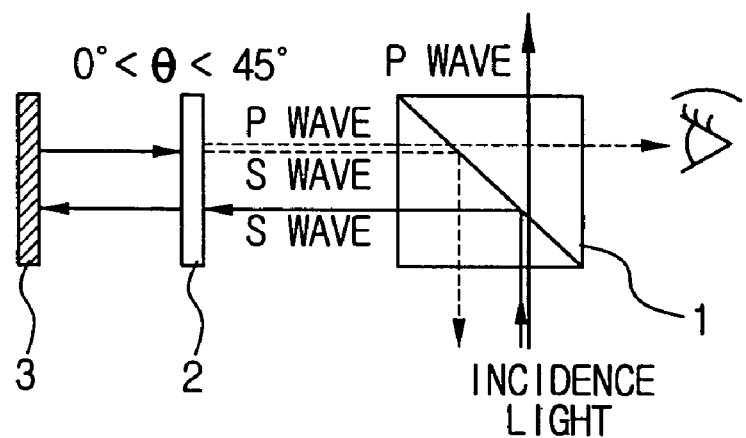
FIG. 4 is a schematic view showing the light path when a voltage, which is lower than the saturation voltage, is applied to the conventional reflective type display device in which the half-V type ferroelectric liquid crystal is applied.
Figure 5:
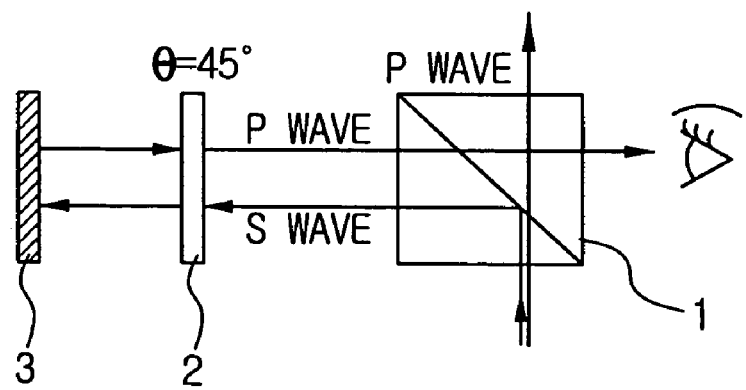
FIG. 5 is a schematic view showing the light path when a saturation voltage is applied to the conventional reflective type display device in which the half-V type ferroelectric liquid crystal is applied.
Figure 6:
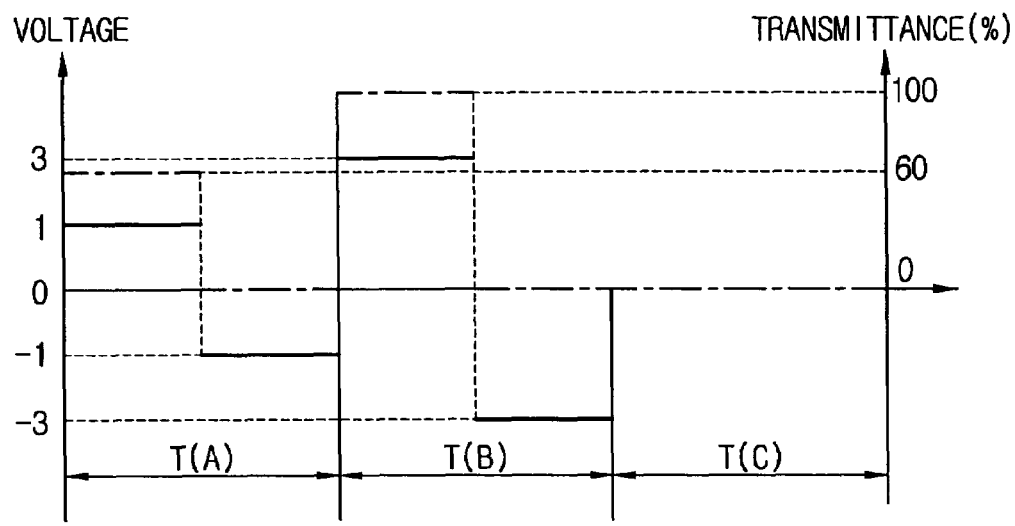
FIG. 6 is a graph showing a relationship between the applied voltage and the transmittance when a gray scale display driving is performed in the conventional reflective type display device in which the half-V type ferroelectric liquid crystal is applied.
Figure 7:
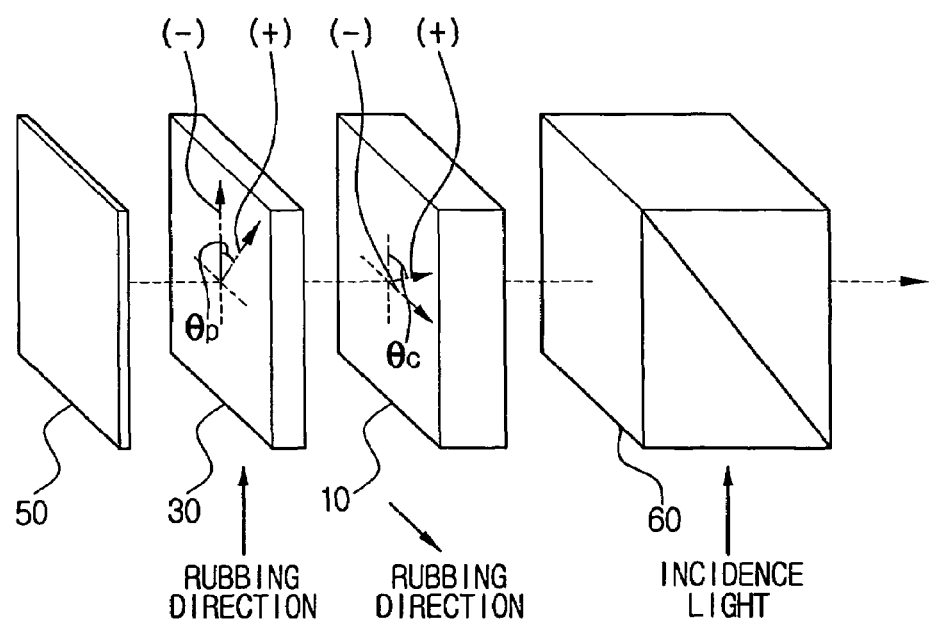
FIG. 7 is a schematic view of a reflective type ferroelectric liquid crystal display according to the present invention.

FIG. 7 is a schematic view of a reflective type ferroelectric liquid crystal display according to the present invention.

Referring to FIG. 7, a reflective type FLCD (ferroelectric liquid crystal display) is provided with a compensation panel 10 and a display panel 30 which are disposed between a polarization beam splitter (PBS) 60 and a mirror 50.

The PBS 60 reflects a beam of a first polarization component and transmits a beam of a second polarization component. In FIG. 7, the PBS 60 reflects an S polarized light and transmits a P polarized light.

Figure 8:
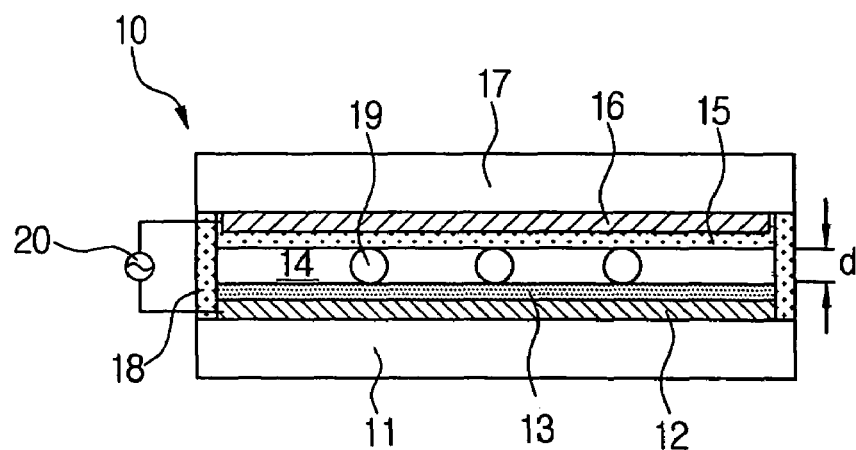
FIG. 8 is a cross-sectional view of a compensation panel of FIG. 7.

The compensation panel 10, as shown in FIG. 8, includes a lower substrate 11, a lower electrode layer 12, a lower alignment film 13, a liquid crystal layer 14, an upper alignment film 15, an upper electrode layer 16, an upper substrate 17, a sealing member 18 and a spacer 19. A reference symbol (−) designates a stable state, i.e., an orientation state of liquid crystal when a negative potential or a potential is not applied. A reference symbol (+) designates the orientation state of the liquid crystal when a positive potential is applied.

The liquid crystal layer 14 is filled with a half-V type ferroelectric liquid crystal material having a bookshelf structure.

The half-V type ferroelectric liquid crystal having the bookshelf structure has a structure that liquid crystal molecules are aligned side by side in rows without bending in a smectic layer which is vertically aligned through a crystallization process. In the half-V type ferroelectric liquid crystal layer, if a corresponding liquid crystal is injected in a melted state and then a temperature of the liquid crystal is dropped, a phase of the liquid crystal is transformed from a chiral nematic phase (N*) into a chiral smectic C-phase (SmC*), thereby obtaining a desired structure.

There are provided various kinds of half-V type liquid crystal materials. In the embodiment, the half-V type liquid crystal fabricated by Clariant Inc. in Japan is applied.

The lower and upper substrates 11 and 17 are formed of a transparent material such as glass or transparent synthetic resin.

The lower and upper electrode layers 12 and 16 are formed of a transparent conductive material, e.g., ITO material. Preferably, the lower and upper electrode layers 12 and 16 are formed of a single electrode plate having a size corresponding to a displaying screen, respectively.

The lower and upper alignment films 13 and 15 are formed of various well-known aligning materials, e.g., polyimide, polyvinyl alcohol, nylon, PVA series and so forth.

The alignment films 13 and 15 are rubbing-processed at a desired angle by a rubbing material like cloth.

The spacer 19 is disposed to constantly maintain a gap d of the liquid crystal layer 14 between the upper and lower layers.

The gap d of the liquid crystal layer is determined so that a product of the gap d and a refractive index anisotropy (Δn) of the half-V type liquid crystal satisfies a condition of λ/2 where (λ) is a wavelength of incident light. That is, the gap of the liquid crystal layer 14 is determined according to a refractive index anisotropic value of the half-V type ferroelectric liquid crystal so that the compensation panel 10 has a function of a half plate with respect to the wavelength (λ) of incident light.

A reference numeral 20 is an AC driving source for applying a desired AC potential through the electrode layers 12 and 16 in a desired frequency to the half-V type ferroelectric liquid crystal injected into the liquid crystal layer 14, when driving the display device.

Meanwhile, the display panel 30 has a well-known structure for independently driving a pixel corresponding to displaying data.

Figure 9:
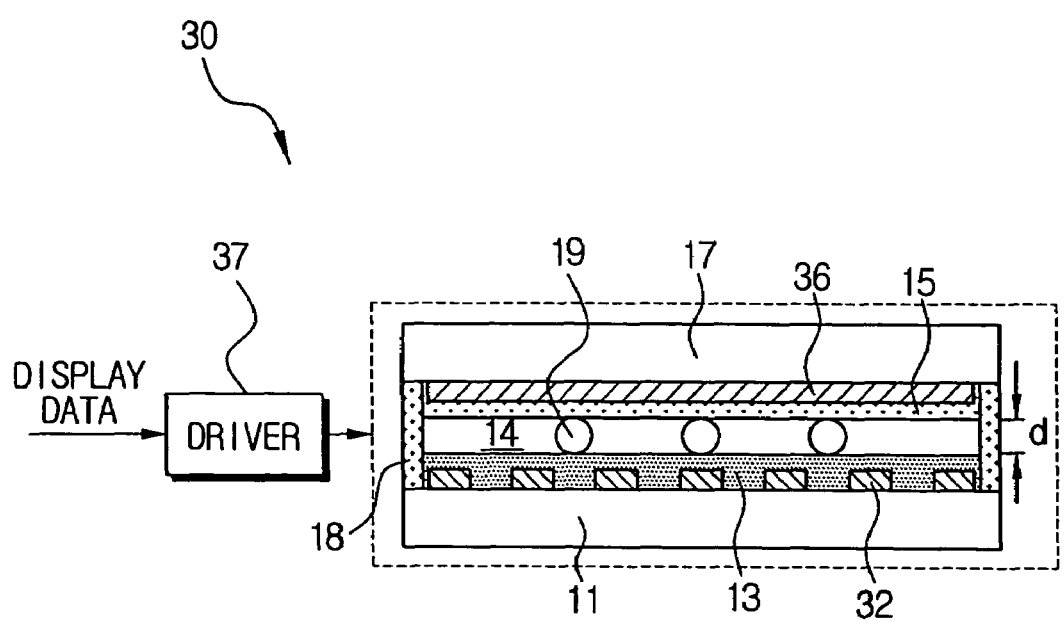
FIG. 9 is a cross-sectional view of a display panel of FIG. 7.

FIG. 9 is a cross-sectional view showing a structure of the display panel of FIG. 7. The same elements as those in FIG. 8 are defined by the same reference numerals.

Referring to FIG. 9, a display panel 30 includes a lower substrate 11, a lower electrode layer 32, a lower alignment film 13, a liquid crystal layer 14, an upper alignment film 15, an upper electrode layer 36, an upper substrate 17, a sealing member 18 and a spacer 19.

The lower and upper electrode layers 32 and 36 of the display panel 30 have different structures from those of the compensation panel 10.

The lower and upper electrode layers 32 and 36 have a plurality of electrodes aligned in different directions to be orthogonal to each other.

The liquid crystal layer 14 of the display panel 30 is filled with the same liquid crystal material as that filled in the liquid crystal layer 14 of the compensation panel 10. That is, the liquid crystal material is the half-V type liquid crystal material.

Preferably, the display panel 30 and the compensation panel 10 are aligned so that the rubbing direction of the alignment films 13 and 15 of the display panel 30 is orthogonal to the rubbing direction of the alignment films 13 and 15 of the compensation panel 10.

The spacer 19 is disposed to constantly maintain a gap d of the liquid crystal layer 14 between the upper and lower layers.

Further, the gap d of the liquid crystal layer 14 of the display panel 30 is determined so that a product of the gap d and the refractive index anisotropy (Δn) of the half-V type liquid crystal satisfies a condition of λ/4 where (λ) is a wavelength of incident light. That is, the gap of the liquid crystal layer 14 is determined according to the refractive index anisotropic value of the half-V type ferroelectric liquid crystal so that the display panel 30 has a function of a quarter plate with respect to the wavelength (λ) of incident light.

A reference numeral 37 is a driver for applying a potential to the electrode layers 32 and 36, in a desired frequency, through the half-V type ferroelectric liquid crystal injected into the liquid crystal layer 14, to each pixel according to the display data.

The driver 37 is connected to the electrode layers 32 and 36 so as to apply the AC potential corresponding to gray scale data of the display data through the electrode layers 32 and 36.

In the reflective type ferroelectric liquid crystal display, if the display panel 30 and the compensation panel 10 are driven so that a light transmitting property is compensated using the AC driving period while the applied potential is properly varied during a predetermined data display period such that the transmittance, with respect to the incident light, can be extended to 100%.

Figure 10:
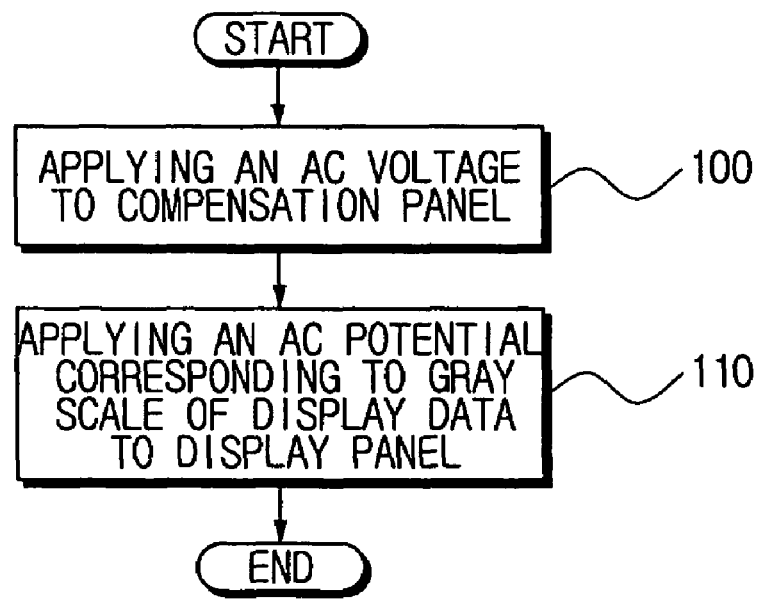
FIG. 10 is a flow chart showing a driving process for displaying the gray scale corresponding to display data of the reflective type ferroelectric liquid crystal display according to the present invention.

FIG. 10 shows a preferable driving process of the ferroelectric liquid crystal display.

A desired AC voltage is applied to the compensation panel 10 (step 100). An AC potential, corresponding the gray scale of the display data, is applied to the display panel 30 (step 110).

That is, in the compensation panel 10, the AC driving is performed with a voltage corresponding to a preset tilt angle of the liquid crystal. In the display panel 30, a level and a phase of the applied AC voltage are varied corresponding to the AC driving period of the compensation panel 10 so as to be capable of obtaining the transmittance corresponding to the display data.

Referring back to FIG. 7, the compensation panel 10 is driven by applying a proper AC voltage so as to obtain a liquid crystal aligning state in which an included angle ($\theta c$) between the rubbing direction of the display panel 30 and a long axis of the liquid crystal of the compensation panel 10 is an angle between 90° and 67.5°. To this end, first, the positive driving voltage (+Vk) to be supplied to the compensation panel 10, by which the included angle ($\theta c$) of 67.5 has to be found. This driving voltage has to be applied to the compensation panel 10 by alternation.

Hereinafter, the light transmitting property with respect to the tilt angle ($\theta p$) of the liquid crystal molecules of the display panel 30 will be described, when a potential below a zero potential is applied to the compensation panel 10.

First, when the potential is not applied to the display panel 30 or the negative potential is applied to the display panel 30, the S wave reflected from the PBS 60 passes through the compensation panel 10 and the display panel 30 without variation of the polarized state. Therefore, a display state becomes black.

On the contrary, if the saturation voltage, by which the liquid crystal is tilted at the maximum tilt angle, i.e., an angle of 45°, is applied to the display panel 30, the S wave reflected from the PBS 60 passes through the compensation panel 10 without the variation of the polarized state. Then, the S wave is transformed into a P wave while passing through the display panel 30, the mirror 50 and the display panel 30. The transformed P wave passes through the compensation panel 10 without the variation of the polarized state, and then passes through the PBS 60. Therefore, the display state is white.

Figure 11A:
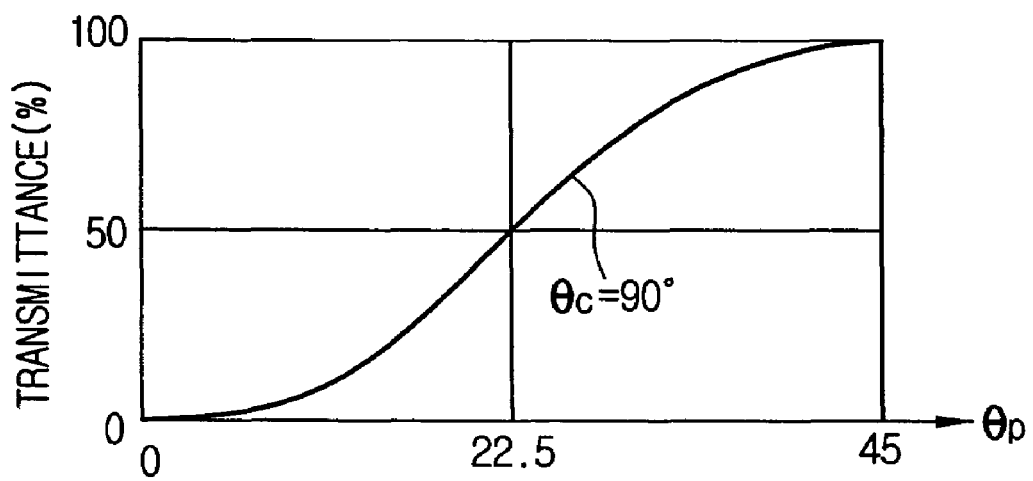
FIGS. 11a and 11b are graphs showing a transmittance according to an axis aligning relationship between the liquid crystal of the compensation panel and the liquid crystal of the display panel, which is varied according to a driving voltage applied to the ferroelectric liquid crystal display according to the driving method of FIG. 10.

FIG. 11a shows a graph of the light transmitting property, as described above.

Therefore, if the positive potential, which is lower than the saturation potential, is applied to the display panel 30, the display state becomes gray between black and white.

Figure 11B:
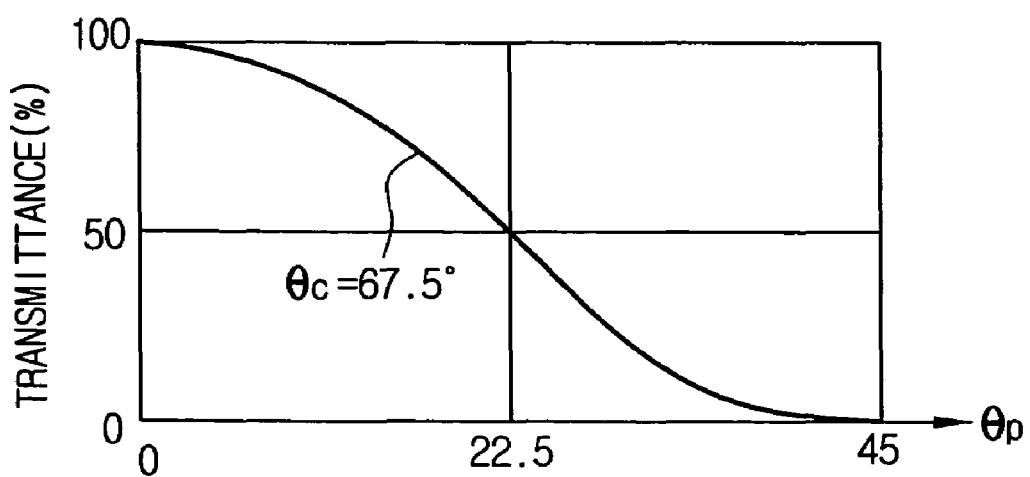

If the positive potential (+Vk), by which the included angle ($\theta c$) with respect to the rubbing direction of the display panel 30 becomes 67.5°, is applied to the compensation panel 10, the light transmitting property with respect to the tilt angle ($\theta p$) of the liquid crystal molecule of the display panel 30 is opposite to the state in the case that the negative potential (−Vk) is applied, that is, when the liquid crystal of the compensation panel 10 is aligned at the angle ($\theta c$) of 90° with respect to the rubbing direction of the liquid crystal of the display panel 10. Therefore, a graph as shown in FIG. 11b is obtained.

Figure 12:
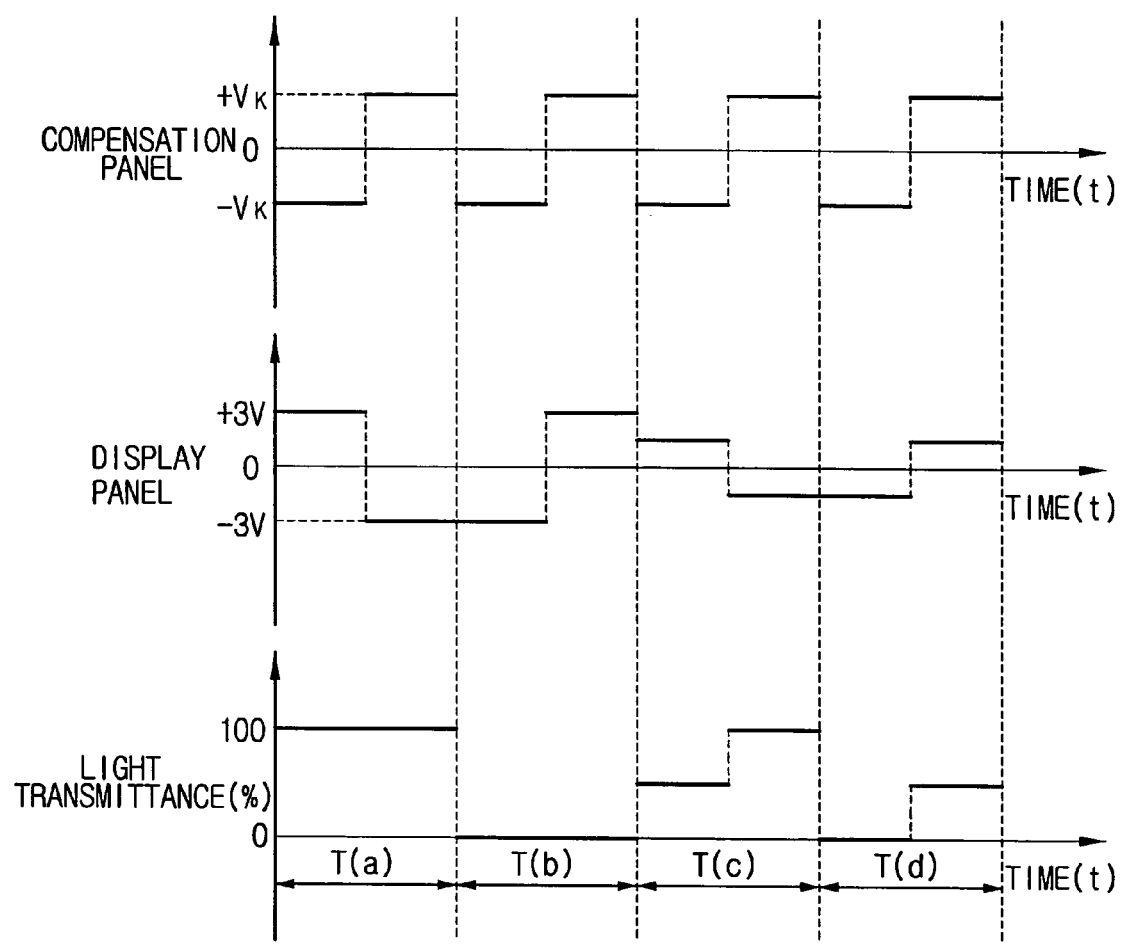
FIG. 12 is a graph showing a relationship between the transmittance and the driving voltage applied to the ferroelectric liquid crystal display in the driving method of FIG. 10.

FIG. 12 shows an embodiment in which the liquid crystal display is driven using the light transmitting property according to the applied potential.

As shown in FIG. 12, in case the saturation voltage corresponding to the maximum tilt angle of the liquid crystal is 3V, an AC potential (Vk) corresponding to a tilt angle of 22.5° is applied to the compensation panel 10 during the preset data display period (T), e.g., a typical frame period of 16.6 ms. An AC voltage corresponding to the gray scale information of the display data is applied to the display panel 30-during the data display period (T).

In the drawing, if a saturation AC potential having a reverse phase to the AC potential applied to the compensation panel 10 is applied to the display panel 30, as described in a region T(a), an average transmittance becomes 100% during a pixel display period. And if a saturation AC potential having the same phase as the AC potential applied to the compensation panel 10 is applied to the display panel 30, as described in a region T(b), the transmittance becomes zero during the pixel display period. Therefore, according to the level and phase of the AC potential applied to the display panel 30, the average transmittance range can be varied from zero to 100% during the display period (T). Thus, a gray scale displaying extent can be precisely segmented.

That is, if a voltage, which is lower than the saturation voltage, is applied to the display panel 30 in the reverse phase to the AC potential applied to the compensation panel 10, as described in a region T(c), the average transmittance range during a pixel display period is determined to be 50–100%.

In the same manner, if the voltage, which is lower than the saturation voltage, is applied to the display panel 30 in the same phase as the AC potential applied to the compensation panel 10, as described in a region T(d), the average transmittance during a pixel display period is determined to be 0–50%.

According to the reflective type FLCD and a driving method thereof of the present invention, as described above, the light loss can be reduced, and thus the gray scale displaying extent can be extended.

While the invention has been shown and described with reference to the preferred embodiments thereof, it will be understood by those skilled in the art that various changes in form and details may be made therein without departing from the sprit and scope of the invention as defined by the appended claims.

What is claimed is:

1. A method of driving a reflective type ferroelectric liquid crystal display having a polarization beam splitter, a display panel disposed between the polarization beam splitter and a mirror to satisfy a quarter plate condition, and in which half-V type ferroelectric liquid crystal is filled between first electrode layers, disposed to be opposite to each other, a compensation panel which is disposed between the display panel and the polarization beam splitter to satisfy a half plate condition, in which half-V type ferroelectric liquid crystal is filled between second electrode layers, disposed to be opposite to each other, and said first and second electrode layers are disposed to be orthogonal to each other, comprising steps of:

applying an AC potential to the second electrode layers of the compensation panel; and applying an AC potential corresponding to a gray scale of display data to the first electrode layers of the display panel;

wherein an AC potential, by which an included angle between an axis of the liquid crystal of the compensation panel and an axis of the liquid crystal of the display panel in a case that a potential is not applied to the display panel is varied within a range of 67.5°–90°, is applied to the second electrode layers of the compensation panel.

2. A method of driving a reflective type ferroelectric liquid crystal display having a polarization beam splitter, a display panel in which half-V type ferroelectric liquid crystal is filled between first electrode layers, disposed to be opposite to each other, a compensation panel in which half-V type ferroelectric liquid crystal is filled between second electrode layers, disposed to be opposite to each other, and said first and second electrode layers are disposed to be orthogonal to each other, comprising steps of:

applying an AC potential to the second electrode layers of the compensation panel; and applying an AC potential corresponding to a gray scale of display data to the first electrode layers of the display panel, wherein an AC potential, by which an included angle between an axis of the liquid crystal of the compensation panel and an axis of the liquid crystal of the display panel in a case that a potential is not applied to the display panel is varied within a range of 67.5°–90°, is applied to the second electrode layers of the compensation panel.

* * * * *